United States Patent [19]

Müller et al.

[11] Patent Number: 4,630,834
[45] Date of Patent: Dec. 23, 1986

[54] SEALING ASSEMBLY FOR UNIVERSAL JOINT

[75] Inventors: Karl-Heinz Müller, Wissen; Alfons Jordan, Hennef, both of Fed. Rep. of Germany

[73] Assignee: Uni-Cardan Aktiengesellschaft, Siegburg, Fed. Rep. of Germany

[21] Appl. No.: 736,415

[22] Filed: May 20, 1985

Related U.S. Application Data

[63] Continuation of Ser. No. 517,466, Jul. 26, 1983, abandoned.

[30] Foreign Application Priority Data

Jul. 27, 1982 [DE] Fed. Rep. of Germany ....... 3227969

[51] Int. Cl.$^4$ .............................................. F16J 15/52
[52] U.S. Cl. .......................... 277/212 FB; 277/212 F; 464/173
[58] Field of Search .................... 464/173, 175; 277/212 F, 212 FB, 212 C, 212 R

[56] References Cited

U.S. PATENT DOCUMENTS

| | | | |
|---|---|---|---|
| 1,183,064 | 5/1916 | Emerson | 464/175 X |
| 2,255,172 | 9/1941 | Johnson | 464/175 X |
| 2,331,982 | 10/1943 | Johnson | 464/175 X |
| 2,451,791 | 10/1948 | Weaver | 464/173 X |
| 3,611,816 | 10/1971 | We et al. | 464/173 X |
| 4,327,925 | 5/1982 | Alexander et al. | 277/212 FB |

FOREIGN PATENT DOCUMENTS 916875 1/1963 United Kingdom ......... 277/212 FB

*Primary Examiner*—Robert S. Ward
*Attorney, Agent, or Firm*—Toren, McGeady, Stanger, Goldberg & Kiel

[57] ABSTRACT

A sealing assembly for a universal joint formed as an annular disc made of resilient material extending in sealing engagement between an inner joint member or a shaft part thereof and an outer joint member with the annular disc being in sealed engagement with the outer joint member and having a central bore formed with a diameter smaller than the diameter of the shaft of the inner joint member extending therethrough in order to effect sealing engagement with the shaft, the central bore being surrounded by a reinforcing annular portion which is dimensioned with an enlarged thickness for reinforcing purposes thereby to enable large angles of articulation to be endured even when the central bore is under extreme loads thereby to provide a rugged construction for the sealing assembly.

6 Claims, 6 Drawing Figures

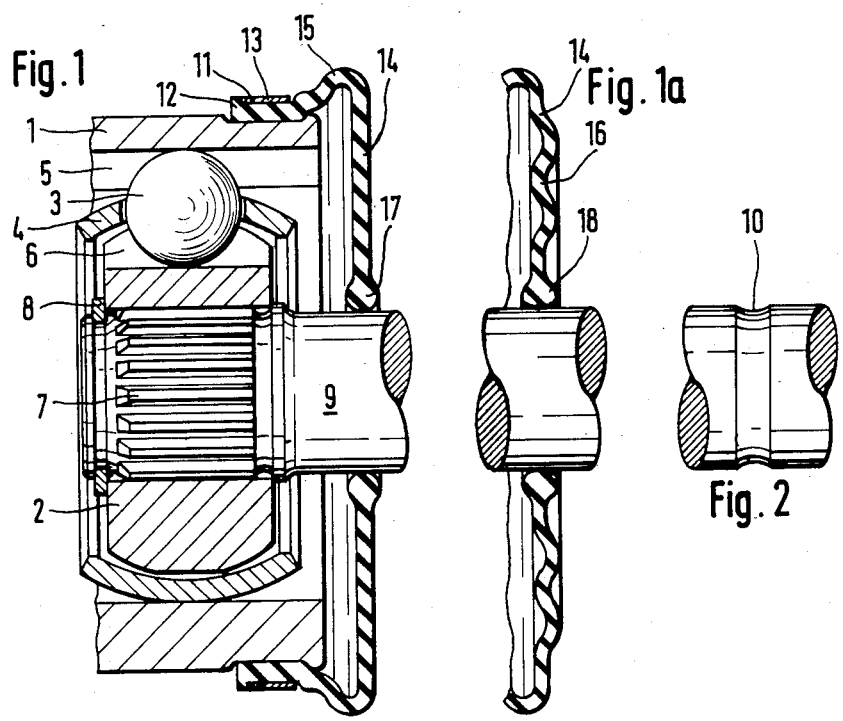

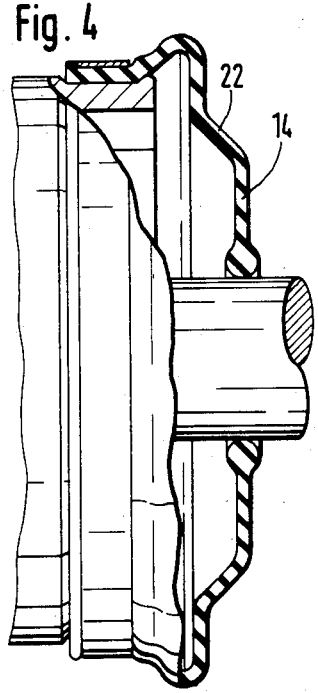
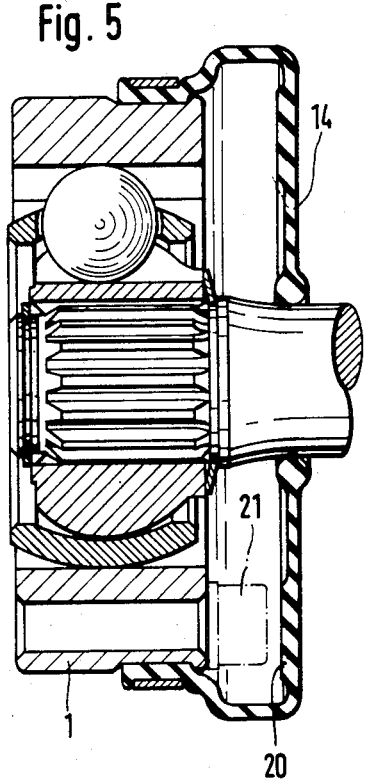
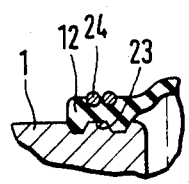

SEALING ASSEMBLY FOR UNIVERSAL JOINT

This is a continuation of application Ser. No. 517,466, filed July 26, 1983, now abandoned.

The present invention relates generally to sealing mechanisms for universal joints and more particularly to a sealing assembly for establishing a sealing connection between the inner and outer members of a rotary constant velocity universal joint, the seal operating to retain lubricant in the joint and to exclude dirt therefrom.

Sealing members of the type to which the present invention relates may be made of rubber or resilient plastic and the sealing member is connected in the region of its radially outer edge with the outer joint member. The radially inner edge of the sealing member is usually connected with an inner joint member or a drive shaft connected thereto, and the sealing member will usually provide protection for the joint while resiliently enabling relative movement between the parts thereof. As a result, the means utilized to seal the inner and outer members of a universal joint may be subjected to the entire relative movement which occurs between the joint members when the joint is in service. This relative movement comprises articulation and also axial movement between the joint members if the joint is a plunging joint.

Seals known in the prior art, for example from U.S. patent application Ser. No. 356,293, are arranged so that the sealing means may comprise a disc of an elastic material secured to the outer joint member and having a central aperture through which there extends a shaft part, which may be a part of the inner joint member or associated therewith, with the free diameter of the aperture being smaller than the diameter of the shaft part. While such a sealing device is effective, the central aperture of the disc of elastic or resilient material may not withstand loads occurring during extreme angles of articulation. After a certain angle of articulation has been reached, further articulation may cause the disc to be bent to an extreme angle, thereby giving rise to consequent risks of damage.

The present invention is therefore directed toward improvement of the sealing assembly of a universal joint in order to overcome or reduce the disadvantages referred to above.

SUMMARY OF THE INVENTION

Briefly, the present invention may be described as a sealing assembly for a rotary universal joint including an outer joint member arranged in torque-transmitting engagement with each other, with a shaft part in rotative driving engagement with the inner joint member, said sealing assembly comprising: an annular disc made of resilient material extending in sealing engagement between said inner joint member and said outer joint member; an annular collar on the radially outer edge of said annular disc secured in sealing engagement with said outer joint member; a central bore formed with a diameter smaller than the diameter of said shaft part having said shaft part extending therethrough in sealing engagement thereiwth; a reinforcing annular portion of enlarged thickness extending circumferentially around said central bore immediately adjacent thereto having a rotund cross-section defining a convexly curved outer configuration in press-fitted engagement around said shaft part; and a plicated configuration formed in the region of the radially outermost portion of said disc to absorb deflecting forces applied thereto.

In accordance with the present invention, the annular disc in the region of the central bore is formed with a circumferentially extending reinforced area, the advantage of this design being that the reinforced portion ensures trouble-free operation.

The advantage of the sealing member according to the invention is that the reinforced annular portion ensures a satisfactory seal with the shaft part, with the tension under which the seal operates being determined by the operational speed of rotation of the joint, the quantity of lubricant contained within the joint, and the dead weight of the sealing member. When the joint is articulated, the plicated configuration, which may consist simply of an annular fold in the sealing member, is deformed and the reinforced annular portion ensures that an effective seal remains established with the shaft part. The sealing member may easily be secured to the outer joint member by a conventional clamping ring adjacent the annular fold and extending about the annular collar on the outer edge of the sealing member. The height and shape of the fold depend upon the angle of articulation of the joint and the extent to which the fold must be deformed during articulation.

A further advantage of the sealing element in accordance with the invention consists in that an elastic material is provided and that the sealing sleeve at its radially outer diameter, due to the fold-like transition, is connected directly to and removably from the outer joint part by means of commercial clamping elements which will provide an adequate lubricant seal.

In accordance with a further, more detailed aspect of the invention, the reinforced area around the central bore may be designed as a rotund cross-section which is a bead having a circular cross-section. Alternatively, the rotound cross-section may be an elliptical cross-section. The advantage of a circular or elliptical bead is that it provides a convexly curved outer configuration so that, in the case of articulation or displacement of the joint, the bead will adapt very readily to the change in the shape of the sealing element thereby permitting the sealing edge, which is in engagement with the shaft part, to roll about its own center within limits to maintain a firm sealing connection with the shaft part as a result of a rolling contact therewith.

In accordance with a further aspect of the invention, the plicated configuration may connect the portion of the sealing member secured to the outer joint member and a radially extending part of the sealing member. Alternatively, the plicated configuration may be provided or formed in a radially extending portion of the sealing member, for example in the form of corrugations.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a sectional view showing a universal joint having a sealing member in accordance with the present invention;

FIG. 1a is a partial sectional view showing a sealing member in accordance with a further embodiment of the invention;

FIG. 2 is a side view of a part of a shaft showing an alternative configuration thereof for use with the invention;

FIG. 3 is a partial sectional view showing part of another embodiment of the sealing member in accordance with the invention;

FIG. 4 is a sectional view showing a further embodiment of a sealing member in accordance with the invention; and FIG. 5 is a sectional view showing still another embodiment of the sealing member in accordance with the invention.

DETAILED DESCRIPTION OF THE PREFERRED EMBODIMENTS

Referring now to the drawings, and particularly to FIG. 1, there is shown therein a universal joint with which the present invention is utilized, the joint comprising an outer joint member 1, an inner joint member 2, and a plurality of circumferentially spaced balls 3 disposed between the joint members in torque-transmitting engagement therebetween. Each of the balls 3 is received in grooves 5 and 6 which are arranged in opposed relationship, respectively, in the outer and inner joint members 1 and 2. A cage 4 is provided between the joint members 1 and 2, with the cage 4 being formed with windows within which the balls 3 are guided and constrained in operational position. The cage constrains the balls so that the centers occupy a common plane and the configuration of the grooves in the joint members is such that, in a manner known to those skilled in the art, the ball center plane bisects the angle between the rotational axes of the inner and outer joint members when the joint is articulated.

The inner joint member is formed with a shaft part 9 or has a shaft part 9 attached thereto in rotative driving engagement by a splined end portion 7 which is received in an aperture of the inner joint member for torque transmission therebetween, with the shaft part 9 being held against axial displacement by a securing ring 8.

In order to seal the interior of the joint, to retain lubricant and to exclude dirt, there is provided a sealing member which is made of a resilient or elastic material, for example rubber or a suitable plastic material. The sealing member comprises an annular disc-like member 14 having a collar 12 held in sealing engagement on the outer joint member 1 within a seat 11 on the exterior of the member 1 with a clamping ring 13 extending around the collar 12. The disc 14 is formed with an annular portion which extends radially from the shaft 9 and a plicated configuration comprising a fold 15 is arranged between this annular portion and the collar 12. The fold 15 enables absorption of forces due to articulated movement of the joint.

The sealing disc 14 is formed with a central aperture through which the shaft part 9 extends. In accordance with the present invention, the central aperture through which the shaft 9 extends is formed with a reinforced portion 17 which defines the central aperture with a free diameter which is smaller than the diameter of the shaft part 9. The reinforced portion 17 is thus stretched or press-fitted over the shaft 9 in order to establish a satisfactory seal therewith. It will be noted that the reinforced portion 17 is formed with a greater thickness than the portion of the disc 14 which extends radially outwardly therefrom and thus a stronger seal assembly results. Furthermore, the portion 17 is formed with a convexly curved outer configuration to maintain engagement with the shaft 9. In the embodiment shown in FIG. 1, the portion 17 is formed as a bead having a generally circular cross-section.

When relative articulation occurs between the inner and outer joint members, this is accommodated by deflection of the annular fold in the sealing member. The bead 17 due to its convex outer configuration is able to undergo a rolling motion relative to the shaft part 9 so as to maintain a satisfactory seal therewith under conditions of joint articulation and/or plunge between the joint members.

A modification of the sealing member shown in FIG. 1 is depicted in FIG. 1a wherein the radially extending annular portion of the sealing disc 14 is provided with a plicated configuration in the form of annular folds or corrugations 16 and wherein the reinforced annular portion surrounding the aperture in the sealing member is in the form of a bead 18 having an elliptical cross-section.

In FIG. 2 there is shown an alternative construction for the shaft part 9 wherein there is provided an annular groove 10 within which the bead 17, 18 engages.

FIG. 4 shows a further embodiment of the invention wherein the sealing member is provided with two distinct axially separated parts joined by a frustoconical portion 22. The frustoconical portion 22 essentially comprises a slanted portion of the sealing disc 14 which extends obliquely relative to the central axis of the shaft part 9.

FIG. 5 shows a further embodiment of the invention wherein a universal joint has an outer joint member provided with circumferentially spaced apertures for receiving axially extending connecting bolts or pins 21 by which the outer joint member may be secured to a flange or other transmission component. The sealing disc 14 is formed with an annular reinforcing portion or ring 20 in order to protect the sealing member in case of contact with the heads of the bolts 21. Thus, by forming the sealing disc 14 with the reinforcing ring or thickened part 20, damage to the ring as a result of possible impact against the bolts 21 is avoided. Except for the provision of the reinforced thickened ring 20, the embodiment of FIG. 5 is essentially similar to that of FIG. 1.

FIG. 3 shows in detail a further modification of the invention wherein the annular collar 12 of the sealing member held on the exterior of the outer joint member 1 is provided with annular lips and wherein the outer member 1 is provided with annular grooves 23 with the corresponding annular lips or projections on the collar 12 extending into the groove or grooves 23. An alternative form of a clamping ring 24 which is made of wire is also provided.

While specific embodiments of the invention have been shown and described in detail to illustrate the application of the inventive principles, it will be understood that the invention may be embodied otherwise without departing from such principles.

What is claimed is:

1. A sealing assembly for a rotary universal joint including an outer joint member and an inner joint member arranged in torque-transmitting engagement with each other, with a shaft part in rotative driving engagement with said inner joint member, said sealing assembly comprising: an annular disc made of resilient material extending in sealing engagement between said inner joint member and said outer joint member; an annular collar on the radially outer edge of said annular disc secured in sealing engagement with said outer joint member; a central bore formed with a diameter smaller than the diameter of said shaft part having said shaft part extending therethrough in sealing engagement therewith; a reinforcing annular portion of enlarged thickness having a rotund cross-sectional configuration extending circumferentially around said central bore immediately adjacent thereto arranged in press-fitted engagement around said shaft part; and a plicated configuration formed in the region of the radially outermost portion of said disc to absorb deflecting forces applied to said disc as a result of relative movement between said shaft part and said outer joint member; said reinforcing annular portion being shaped to define a convexly curved outer configuration in abutting engagement with said shaft part and said shaft part being formed with a smooth continuous cylindrical surface along which said abutting engagement is maintained to effect a rolling contact between said reinforcing annular portion and said shaft part thereby to insure continued sealing engagement therebetween during relative movement between said shaft part and said outer joint member.

2. A sealing assembly for a rotary universal joint including an outer joint member and an inner joint member arranged in torque-transmitting engagement with each other, with a shaft part in rotative driving engagement with said joint member, said sealing assembly comprising: an annular disc made of resilient material extending in sealing engagement between said inner joint member and said outer joint member; an annular collar on the radially outer edge of said annular disc secured in sealing engagement with said outer joint member; a central bore formed with a diameter smaller than the diameter of said shaft part having said shaft part extending therethrough in sealing engagement therewith; a reinforcing annular portion of enlarged thickness having a rotund crosssectional configuration extending circumferentially around said central bore immediately adjacent thereto arranged in pressfitted engagement around said shaft part; a plicated configuration formed in the region of the radially outermost portion of said disc to absorb deflecting forces applied to said disc as a result of relative movement between said shaft part and said outer joint member; said reinforcing annular portion being shaped to define a convexly curved outer configuration in abutting engagement with said shaft part and said shaft part being formed with a smooth continuous cylindrical surface along which said abutting engagement is maintained to effect a rolling contact between said reinforcing annular portion and said shaft part thereby to insure continued sealing engagement therebetween during relative movement between said shaft part and said outer joint member; axially extending connecting pins formed on said other joint member at a point radially between said annular collar and said reinforcing annular portion for securing said outer joint member to another component; and thickened portions on said annular disc immediately adjacent said connecting pins to prevent damage to said disc as a result of impact thereof against said connecting pins.

3. A sealing assembly for a rotary universal joint including an outer joint member and an inner joint member arranged in torque-transmitting engagement with each other, with a shaft part in rotative driving engagement with said inner joint member, said sealing assembly comprising: an annular disc made of resilient material extending in sealing engagement between said inner joint member and said outer joint member; an annular collar on the radially outer edge of said annular disc secured in sealing engagement with said outer joint member; a central bore formed with a diameter smaller than the diameter of said shaft part having said shaft part extending therethrough in sealing engagement therewith; a reinforcing annular portion of enlarged thickness extending circumferentially around said central bore immediately adjacent thereto; and an annular fold formed in the region of the radially outermost portion of said disc to absorb deflecting forces applied thereto; said reinforcing annular portion being formed as a bead having a generally circular cross-sectional configuration in abutting engagement with said shaft part and said shaft part being formed with a smooth continuous cylindrical surface along which said abutting engagement is maintained to effect a rolling contact between said reinforcing annular portion and said shaft part thereby to insure continued sealing engagement therebetween during relative movement between said shaft part and said outer joint member; said annular disc being formed with a frustoconical portion extending obliquely relative to the axis of said shaft between said annular collar and said reinforcing portion.

4. A sealing assembly for a rotary universal joint including an outer joint member and an inner joint member, arranged in torque-transmitting engagement with each other, with a shaft part in rotative driving engagement with said inner joint member, said sealing assembly comprising: an annular disc made of resilient material extending in sealing engagement between said inner joint member and said outer joint member; an annular collar on the radially outer edge of said annular disc secured in sealing engagement with said outer joint member; a central bore formed with a diameter smaller than the diameter of said shaft part having said shaft part extending therethrough in sealing engagement therewith; a reinforcing annular portion of enlarged thickness extending circumferentially around said central bore immediately adjacent thereto; and an annular fold formed in the region of the radially outermost portion of said disc to absorb deflecting forces applied thereto; said reinforcing annular portion being formed as a bead having a generally elliptical cross-sectional configuration in abutting engagement with said shaft part and said shaft part being formed with a smooth continuous cylindrical surface along which said abutting engagement is maintained to effect a rolling contact between said reinforcing annular portion and said shaft part thereby to insure continued sealing engagement therebetween during relative movement between said shaft part and said outer joint member; said annular disc being formed with a frustoconical portion extending obliquely relative to the axis of said shaft between said annular collar and said reinforcing portion.

5. A sealing assembly for a rotary universal joint including an outer joint member and an inner joint member arranged in torque-transmitting engagement with each other, with a shaft part in rotative driving engagement with said inner joint member, said sealing assembly comprising: an annular disc made of resilient material extending in sealing engagement between said inner joint member and said outer joint member; an annular collar on the radially outer edge of said annular disc secured in sealing engagement with said outer joint member; a central bore formed with a diameter smaller than the diameter of said shaft part having said shaft part extending therethrough in sealing engagement therewith; a reinforcing annular portion of enlarged thickness extending circumferentially around said central bore immediately adjacent thereto; and an annular fold formed in the region of the radially outermost portion of said disc to absorb deflecting forces applied thereto; said reinforcing annular portion being formed as a bead having a generally circular cross-sectional configuration in abutting engagement with said shaft part and said shaft part being formed with a smooth continuous cylindrical surface along which said abutting engagement is maintained to effect a rolling contact between said reinforcing annular portion and said shaft part thereby to insure continued sealing engagement therebetween during relative movement between said shaft part and said outer joint member; said inner joint member including axially extending connecting pins with said annular disc being formed with a thickened portion immediately adjacent said connecting pins to prevent damage to said disc as a result of impact thereof against said pins.

6. A sealing assembly for a rotary universal joint including an outer joint member and an inner joint member arranged in torque-transmitting engagement with each other, with a shaft part in rotative driving engagement with said inner joint member, said sealing assembly comprising: an annular disc made of resilient material extending in sealing engagement between said inner joint member and said outer joint member; an annular collar on the radially outer edge of said annular disc secured in sealing engagement with said outer joint member; a central bore formed with a diameter smaller than the diameter of said shaft part having said shaft part extending therethrough in sealing engagement therewith; a reinforcing annular portion of enlarged thickness extending circumferentially around said central bore immediately adjacent thereto; and an annular fold formed in the region of the radially outermost portion of said disc to absorb deflecting forces applied thereto; said reinforcing annular portion being formed as a bead having a generally elliptical cross-sectional configuration in abutting engagement with said shaft part and said shaft part being formed with a smooth continuous cylindrical surface along which said abutting engagement is maintained to effect a rolling contact between said reinforcing annular portion and said shaft part thereby to insure continued sealing engagement therebetween during relative movement between said shaft part and said outer joint member; said inner joint member including axially extending connecting pins with said annular disc being formed with a thickened portion immediately adjacent said connecting pins to prevent damage to said disc as a result of impact thereof against said pins.

* * * * *